United States Patent
Zhou (10) Patent No.: US 12,125,478 B2
(45) Date of Patent: Oct. 22, 2024

(54) SYSTEM AND METHOD FOR A NATURAL LANGUAGE UNDERSTANDING SYSTEM BASED ON ITERATIVE INTENT DETECTION AND SLOT FILLING NEURAL LAYERS

(71) Applicant: Robert Bosch GmbH, Stuttgart (DE)

(72) Inventor: Zhengyu Zhou, Fremont, CA (US)

(73) Assignee: Robert Bosch GmbH (DE)

( * ) Notice: Subject to any disclaimer, the term of this patent is extended or adjusted under 35 U.S.C. 154(b) by 323 days.

(21) Appl. No.: 17/409,239

(22) Filed: Aug. 23, 2021

(65) Prior Publication Data
US 2023/0069049 A1    Mar. 2, 2023

(51) Int. Cl.
*G06F 16/248*    (2019.01)
*G10L 15/16*    (2006.01)
*G10L 15/18*    (2013.01)

(52) U.S. Cl.
CPC .......... *G10L 15/1815* (2013.01); *G10L 15/16* (2013.01)

(58) Field of Classification Search
CPC ........ G06N 3/045; G06N 3/044; G10L 15/16; G10L 15/063; G10L 15/18; G10L 15/32; G06F 40/30
See application file for complete search history.

(56) References Cited

U.S. PATENT DOCUMENTS

| | | | |
|---|---|---|---|
| 9,870,356 B2* | 1/2018 | Hakkani-Tür | G06N 5/00 |
| 10,268,679 B2* | 4/2019 | Li | G10L 15/063 |
| 10,553,215 B2* | 2/2020 | Saddler | G10L 13/02 |
| 10,916,237 B2* | 2/2021 | Yan | G10L 15/063 |
| 10,936,947 B1* | 3/2021 | Flunkert | G06N 3/044 |
| 10,970,278 B2* | 4/2021 | Yan | G06F 40/284 |
| 11,231,946 B2* | 1/2022 | Liu | G10L 15/02 |
| 2016/0174902 A1 | 6/2016 | Georgescu et al. | |
| 2016/0336006 A1* | 11/2016 | Levit | G10L 15/063 |
| 2018/0103052 A1* | 4/2018 | Choudhury | H04L 63/20 |
| 2018/0157638 A1* | 6/2018 | Li | G10L 15/22 |
| 2018/0203852 A1* | 7/2018 | Goyal | G06F 40/56 |

(Continued)

OTHER PUBLICATIONS

Chen, Qian, Zhu Zhuo, and Wen Wang. "Bert for joint intent classification and slot filling." arXiv preprint arXiv:1902.10909 (2019), 6 pages.

Qin, Libo, Wanxiang Che, Yangming Li, Haoyang Wen, and Ting Liu. "A stack-propagation framework with token-level intent detection for spoken language understanding." arXiv preprint arXiv:1909.02188 (2019), 10 pages.

(Continued)

*Primary Examiner* — Jakieda R Jackson
(74) *Attorney, Agent, or Firm* — Dickinson Wright PLLC (57) ABSTRACT

A computer-implemented method includes receiving one or more word embedding vectors in response to data indicative of one or more words. The method also includes utilizing a first recurrent neural network, outputting one or more intent representation vectors utilizing the one or more word embedding vectors; utilizing a second recurrent neural network, outputting one or more slot representation vectors utilizing the one or more intent representation vectors and the one or more word embedding vectors; and utilizing at least an additional third recurrent neural network and a fourth recurrent neural network, outputting a sentence intent and a slot label based on the one or more word embedding vectors, the one or more intent representation vectors, or the one or more slot representation vectors from either the first or second recurrent neural network.

20 Claims, 5 Drawing Sheets

(56) References Cited

U.S. PATENT DOCUMENTS

| | | | |
|---|---|---|---|
| 2019/0121853 A1* | 4/2019 | Cai | G06N 3/006 |
| 2019/0244603 A1* | 8/2019 | Angkititrakul | G10L 15/1815 |
| 2019/0371307 A1* | 12/2019 | Zhao | G10L 15/26 |
| 2020/0011676 A1* | 1/2020 | Ye | G01C 21/3446 |
| 2020/0050667 A1 | 2/2020 | Lin | |
| 2020/0160167 A1* | 5/2020 | Gupta | G06N 3/045 |
| 2020/0326923 A1* | 10/2020 | Kaler | G06F 8/64 |
| 2020/0342060 A1* | 10/2020 | Park | G06N 3/044 |
| 2020/0342857 A1* | 10/2020 | Moreno | G10L 15/20 |
| 2020/0357392 A1 | 11/2020 | Zhou et al. | |
| 2020/0387799 A1* | 12/2020 | Vivekraja | G06N 3/105 |
| 2021/0073287 A1* | 3/2021 | Hunter | H04L 63/123 |
| 2021/0174016 A1* | 6/2021 | Fox | G06N 3/044 |
| 2021/0217408 A1* | 7/2021 | Hakkani-Tur | G06F 40/284 |
| 2021/0248460 A1* | 8/2021 | Sykora | G06N 3/08 |
| 2021/0342684 A1* | 11/2021 | Shraga | G06F 16/2282 |
| 2022/0090481 A1* | 3/2022 | Aljedaani | E21B 21/08 |
| 2022/0342673 A1* | 10/2022 | Wang | G06F 8/4441 |
| 2022/0374645 A1* | 11/2022 | Santoro | G06F 40/295 |
| 2023/0056680 A1* | 2/2023 | Thomas | G10L 15/065 |
| 2023/0395069 A1* | 12/2023 | Moreno | G10L 15/30 |

OTHER PUBLICATIONS

Liu, Bing, and Ian Lane. "Attention-based recurrent neural network models for joint intent detection and slot filling." arXiv preprint arXiv:1609.01454 (2016), 5 pages.

Wang, Yu, Yilin Shen, and Hongxia Jin. "A bi-model based rnn semantic frame parsing model for intent detection and slot filling." arXiv preprint arXiv:1812.10235 (2018), 6 pages.

Zhang, Chenwei, Yaliang Li, Nan Du, Wei Fan, and Philip S. Yu. "Joint slot filling and intent detection via capsule neural networks." arXiv preprint arXiv:1812.09471 (2018), 9 pages.

Niu, Peiqing, Zhongfu Chen, and Meina Song. "A novel bi-directional interrelated model for joint intent detection and slot filling." arXiv preprint arXiv:1907.00390 (2019), 5 pages.

Goo, Chih-Wen, Guang Gao, Yun-Kai Hsu, Chih-Li Huo, Tsung-Chieh Chen, Keng-Wei Hsu, and Yun-Nung Chen. "Slot-gated modeling for joint slot filling and intent prediction." In Proceedings of the 2018 Conference of the North American Chapter of the Association for Computational Linguistics: Human Language Technologies, vol. 2 (Short Papers), pp. 753-757. 2018, 5 pages.

Ni et al., Natural language understanding approaches based on joint task of intent detection and slot filling for IoT voice interaction, Neural Computing and Applications, vol. 32, pp. 16149-16166, Mar. 13, 2020.

\* cited by examiner

SYSTEM AND METHOD FOR A NATURAL LANGUAGE UNDERSTANDING SYSTEM BASED ON ITERATIVE INTENT DETECTION AND SLOT FILLING NEURAL LAYERS

TECHNICAL FIELD

The present disclosure relates to computing systems, including those utilizing natural language understanding (NLU) systems.

BACKGROUND

Two mains tasks for natural language understanding (NLU) is a technology related for many language or speech related applications, such as dialog systems. Intent detection and slot-filling are two tasks of NLU, target to detect the user intent (e.g., play music) and the relevant slots (e.g., song/artist names) in an input sentence (e.g., "play Faded by Alan Walker"). The two tasks may be modeled individually utilizing traditional algorithms, such as maximum entropy model, support vector machines, and conditional random fields or various neural networks.

SUMMARY

According to a first embodiment, a computer-implemented method, including receiving one or more word embedding vectors in response to data indicative of one or more words, utilizing a first recurrent neural network, output one or more intent representation vectors utilizing the one or more word embedding vectors, utilizing a second recurrent neural network, output one or more slot representation vectors utilizing the one or more intent representation vectors and the one or more word embedding vectors, and utilizing at least an additional third recurrent neural network and a fourth recurrent neural network, output a sentence intent and a slot label based on the one or more word embedding vectors, the one or more intent representation vectors, or the one or more slot representation vectors from either the first or second recurrent neural network.

According to a second embodiment, natural language system includes a processor programmed to receive data indicative of a natural language statement, provide one or more tokens associated with the natural language statement to a recurrent neural network, output one or more intent representation vectors in response to the one or more tokens and output one or more slot representation vectors in response to both the one or more tokens and the one or more intent representation vectors during a first iteration, and utilizing at least a second iteration in addition to the first iteration, output a sentence intent and a slot label based on the one or more word embedding vectors, the one or more intent representation vectors, or the one or more slot representation vectors from the first iteration.

According to a third embodiment, a natural language system includes a processor programmed to receive data indicative of a natural language statement, provide one or more word embedding vectors associated with the natural language statement to a recurrent neural network, output one or more intent representation vectors in response to the one or more word embedding vectors and output one or more slot representation vectors in response to both the one or more word embedding vectors and the one or more intent representation vectors during a first iteration; and utilizing at least one or more high-level iterations in addition to the first iteration, output a sentence intent and a slot label based on the one or more word embedding vectors, the one or more intent representation vectors, or the one or more slot representation vectors from a previous iteration.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

NLU may be a subcategory of natural language processing technology. The major tasks of NLU are that given a text sentence, detect the intent of the sentence as well as the slots contained in the sentence, referred to as intent detection and slot filling, respectively. For example, for the sentence "I want to fly from Boston to Denver this Wednesday", the intent may be "booking a flight", while the slots include "departure city" (i.e., "Boston"), "arrival city" (i.e., "Denver"), and "flight date" (i.e., "this Wednesday").

In a NLU solution, intent detection and slot filling can be addressed in various ways. Some solutions conduct intent detection and slot filling as separate independent modules. Some solutions first conduct intent detection and then conduct slot filling, where the slot detection procedure optionally uses the previously detected intent as additional feature for slot detection. A recent trend of NLU is to jointly learn intent detection and slot filling, which typically brings better overall accuracy (i.e., the rate that both the intent and the slots are correctly detected).

To achieve optimal NLU performance, there are several questions to be addressed for joint learning, e.g., (1) what kind of intent information is helpful for slot filling, (2) what kind of slot information is helpful for intent detection, and (3) how the intent and slot information should be combined to achieve the optimal training/testing performance. In an embodiment of a the NLU system, the system may iteratively updates intent detection and slot filling modules based on the most useful slot and intent information, respectively. Once the model is trained, the number of intent-slot repetitions (i.e., N) for inference can be different from (e.g., smaller than) that used in training. This may bring significant improvement on inference efficiency.

This disclosure below proposes a method and/or system for Natural Language Understanding (NLU). The proposed NLU approach iteratively updates intent detection and slot filling modules based on not only word embedding but also the slot and intent information, respectively, extracted from the previous module. Compared to previous NLU methods, our approach differs in the sense that it attempts to optimize the joint learning of intent detection and slot filling by (1) extracting the most useful slot information to facilitate intent detection, (2) extracting the most useful intent information to facilitate slot filling, and (3) conducting iterative intent/slot detection based on the available slot/intent information to imitate human behavior when understanding sentences, especially those challenging ones. In addition, the disclosure shows results of experiments on two popular NLU benchmarking datasets, ATIS and SNIPS, and the experimental results show that the disclosure proposed outperformed other NLU methods on both of the datasets.

Figure 1:
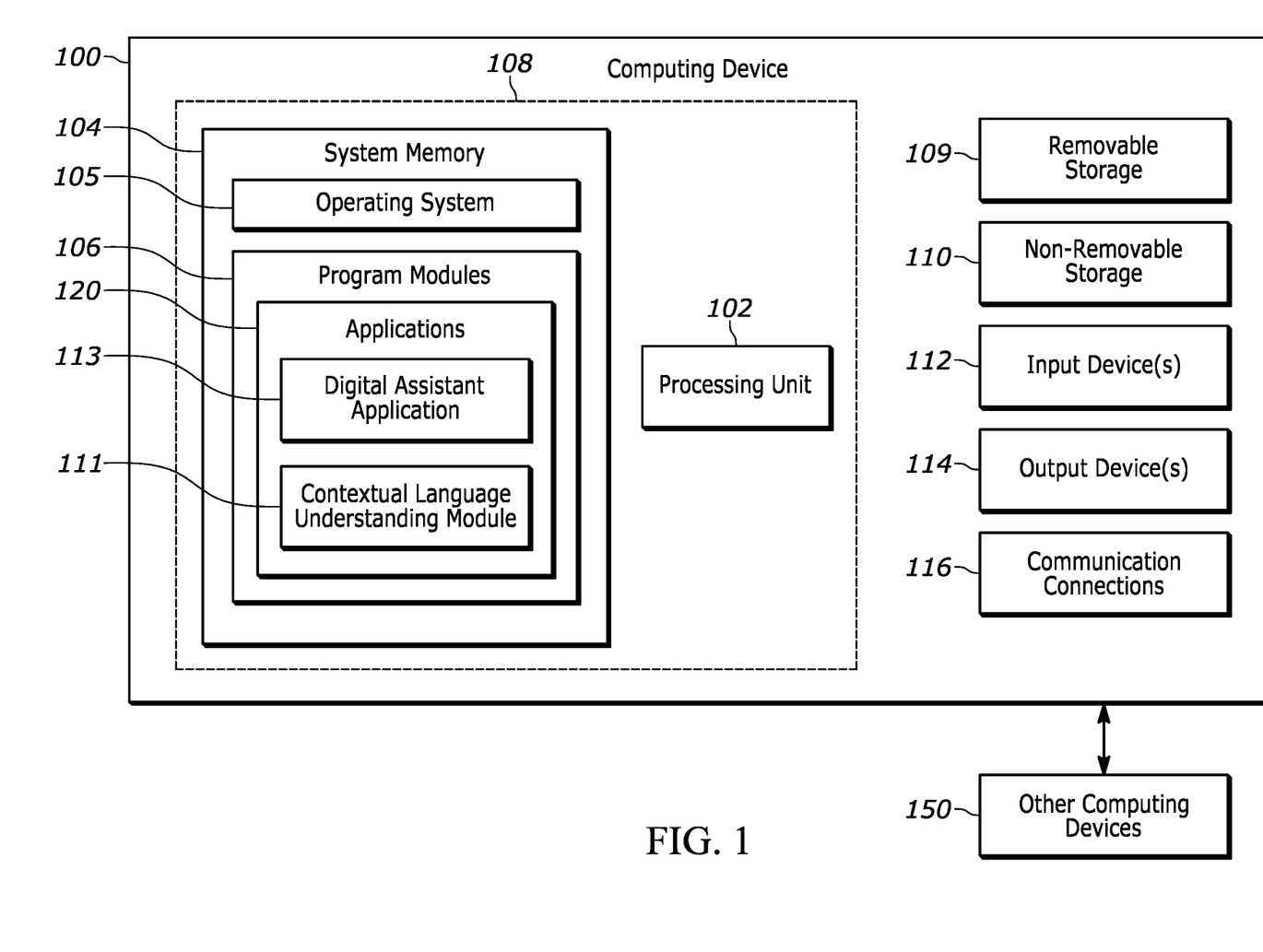
FIG. 1 illustrates a block diagram of physical components (e.g., hardware) of a computing device.

FIG. 1 is a block diagram illustrating physical components (e.g., hardware) of a computing device 100 with which aspects of the disclosure may be practiced. The computing device components described below may have computer executable instructions for a digital assistant application 113, e.g., of a client and/or computer, executable instructions for contextual language understanding module 111, e.g., of a client. In a basic configuration, the computing device 100 may include at least one processing unit 102 and a system memory 104. Depending on the configuration and type of computing device, the system memory 104 may comprise, but is not limited to, volatile storage (e.g., random access memory), non-volatile storage (e.g., read-only memory), flash memory, or any combination of such memories. The system memory 104 may include an operating system 105 and one or more program modules 106 suitable for running software applications 120 such as contextual language understanding applications and, in particular, digital assistant application 113 or contextual language understanding module 111. The operating system 105, for example, may be suitable for controlling the operation of the computing device 100. Furthermore, embodiments of the disclosure may be practiced in conjunction with a graphics library, other operating systems, or any other application program and is not limited to any particular application or system. This basic configuration is illustrated in FIG. 1 by those components within a dashed line 108. The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 104. While executing on the processing unit 102, the program modules 106 (e.g., contextual language understanding module 111 or digital assistant application 113) may perform processes including, but not limited to, the aspects, as described herein. Other program modules that may be used in accordance with aspects of the present disclosure, and in particular for contextual language understanding, may include single-turn models, multi-turn models, combination models, final models, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 100 may also have one or more input device(s) 112 such as a keyboard, a mouse, a pen, a sound or voice input device, a touch or swipe input device, etc. The output device(s) 114 such as a display, speakers, a printer, etc. may also be included. The aforementioned devices are examples and others may be used. The computing device 100 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 104, the removable storage device 109, and the non-removable storage device 110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 100. Any such computer storage media may be part of the computing device 100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 2:
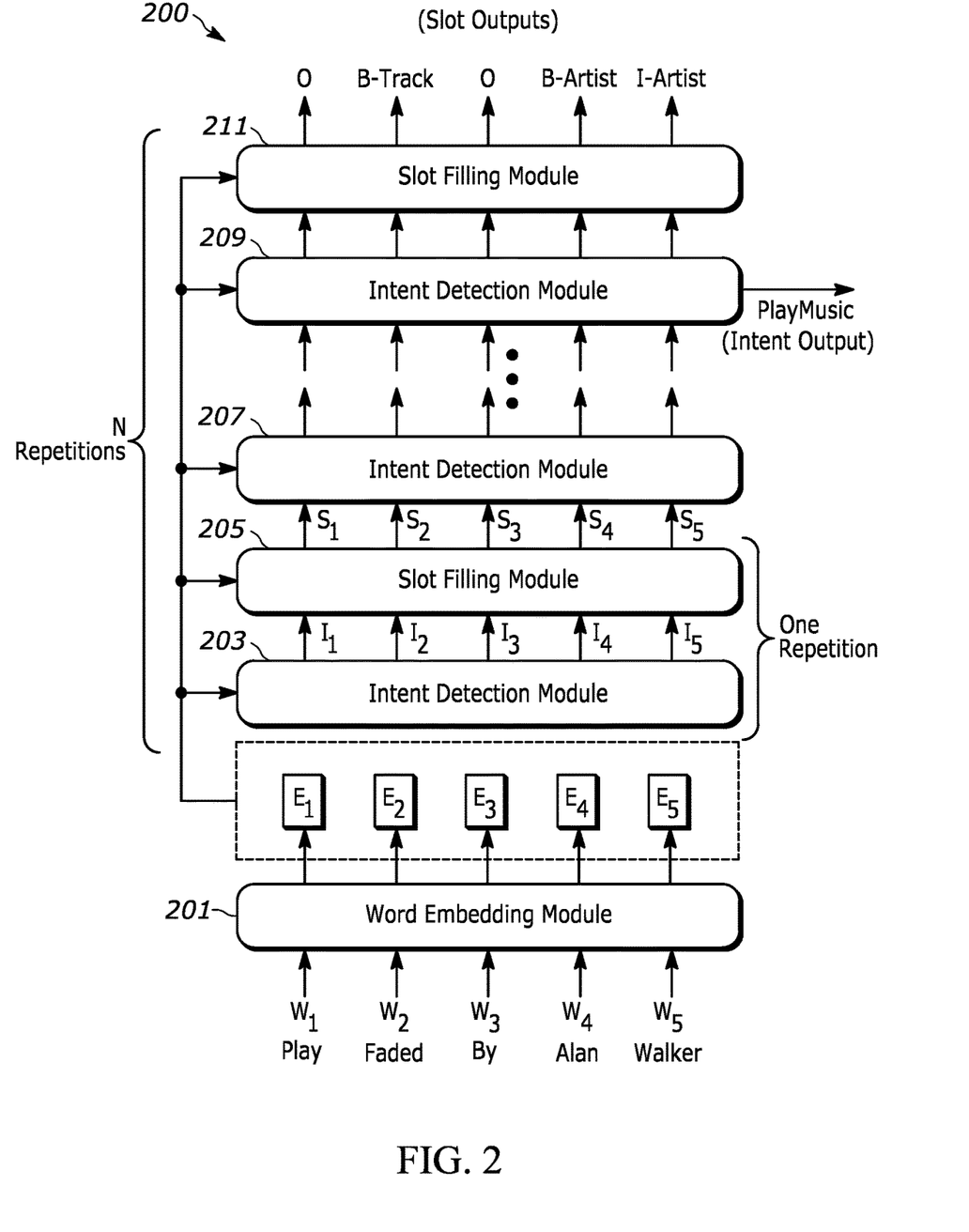
FIG. 2 illustrates a system that include joint-learning Natural Language Understanding capabilities.

FIG. 2 is an embodiment of an overall system 200 structure of a joint-learning NLU system. The system framework may involve N repetitions of intent detection modules 201, 207, and 209 and slot filling modules 203, 207, 211, stacked upon an embedding module to enable iterative intent detection and slot filling.

For an input sentence, the system may represent each word in the sentence as a word embedding vector. The system may encode each word $w_k$ as an embedding vector $e_k$. The word embedding module 201 can be implemented with a pre-trained model or developed from scratch. In one embodiment, a BERT module may be utilized to generate contextualized word embedding vectors. The word embedding vector can be generated by certain pre-trained model (e.g., pre-trained BERT model) or by a self-defined word embedding layer trained from scratch. Thus after the word embedding module 201, the sentence (i.e., word sequence) is transferred into a sequence of word embedding vectors.

The system may feed the word embedding vectors into the intent detection module 203. Thus, each intent module may receive the word embedding as well as the slot information representations (e.g., $s_1, s_2, \ldots s_n$) extract from the preceding slot module (if available) as the module input, and generate a sequence of representations (e.g., $i_1, i_2, \ldots i_n$) that encode the detected intent(s). The intent detection module 203 is implemented as a certain type of neural network layer(s). The subsequent slot module (e.g., 205, 209, etc) then conducts slot filling utilizing those intent representations together with the word embedding as input. The last intent module 209 and slot module 211 may then generate the final intent and slot prediction, respectively. For example, the intent may be to "Play Music" while the slots may be the track, artist, album, playlist, etc to play (e.g., Faded by Alan Walker). In an alternative embodiment, the intent and slot modules in each repetition can be switch with minimal system modifications.

The intent detection module 203 may generate an intent representation vector per token/word for the sentence in focus. The system may then feed the word embedding vector, as well as the intent representation vector for each token/word, into the slot filling module 205. The slot filling module 205 may also be implemented as certain type of neural network layer(s). For each token/word, it receives the intent representation vector as well as the corresponding word embedding vector as the input, and it outputs a slot representation vector per token. Finally, the system may then work to feed the word embedding vectors as well as the slot representation vectors into the higher-level intent detection module 207. For each token, the intent detection module 207 may receive the corresponding slot representation vector previously generated as well as the corresponding word embedding vector as the input. As the first intent detection module 207, it also generates one intent representation vector for each word in the focused sentence, which will be fed into the higher-level slot detection module.

The repetition of intent detection module 207 and slot detection module may repeat N times (N can either be a predefined parameter or be determined during the training or inference procedure based on certain criterion). For the final intent detection module, it predicts the sentence intent based on certain sentence representation vector through a linear Softmax layer. For the final slot detection module, it predicts the slot label based on certain token representation vector per token (i.e., word) also through a linear Softmax layer.

The overall neural network is thus trainable using cross-entropy loss function with certain optimization algorithms. If pre-trained word embedding model is used in the word embedding module. It is optional to fine-tune the parameters in the word embedding model during the training. The system may train the whole framework utilizing joint cross-entropy loss functions as follows:

$$\mathcal{L}_{joint} = -\sum_{j=1}^{n_I} y_j^I \log(\hat{y}_j^I) - \sum_{i=1}^{L}\sum_{j=1}^{n_S} y_{i,j}^S \log(\hat{y}_{i,j}^S)$$

Where $n_I$ and $n_S$ refer to the numbers of intent and slot types respectively, $y^{\wedge I}$ and $y^{\wedge S}$ refer to the intent and slot predictions, $y^I$ and $y^S$ refer to the corresponding ground-truth for intent and slot, and L refers to the number of tokens in the sentence.

In the proposed system, the multiple intent detection modules may or may not use tied parameters, and the multiple slot filling modules may or may not use tied parameters. In case of both of them use tied parameters, during inference, it is feasible to only apply one intent detection module and one slot filling module to get the intent detection result and the slot filling result.

For the word embedding module, the system may use the pre-trained BERT model to dynamically generate a word embedding vector for each word in the given input sentence. We also allow the fine-tuning of the BERT parameters during training.

In one embodiment, the system may implement both the intent detection module and the slot filling module based on bi-directional LSTM. For intent detection module, the system may concatenate the last hidden state of the each direction of LSTM to generate the sentence representation vector. For the last intent detection module, the system may predict sentence intent based on this sentence representation vector. For the other intent detection module, the sentence representation vector and token-wide hidden representations from all tokens/words are weighted summed into an intent representation vector for each token through an attention neural network, according to the previous state of the slot-filling bi-directional LSTM for the target token in the subsequence slot filling module. The attention neural network may be implemented in a number of ways. The resulting intent representation vector will be fed into the bi-directional LSTM of the subsequence slot filling module. Note that the token-wise hidden representation for a token is the concatenation of the hidden state from the forward LSTM and the hidden state from the backward LSTM for that token. The method to calculate the intent representation vector is shown in FIG. 3.

Figure 3:
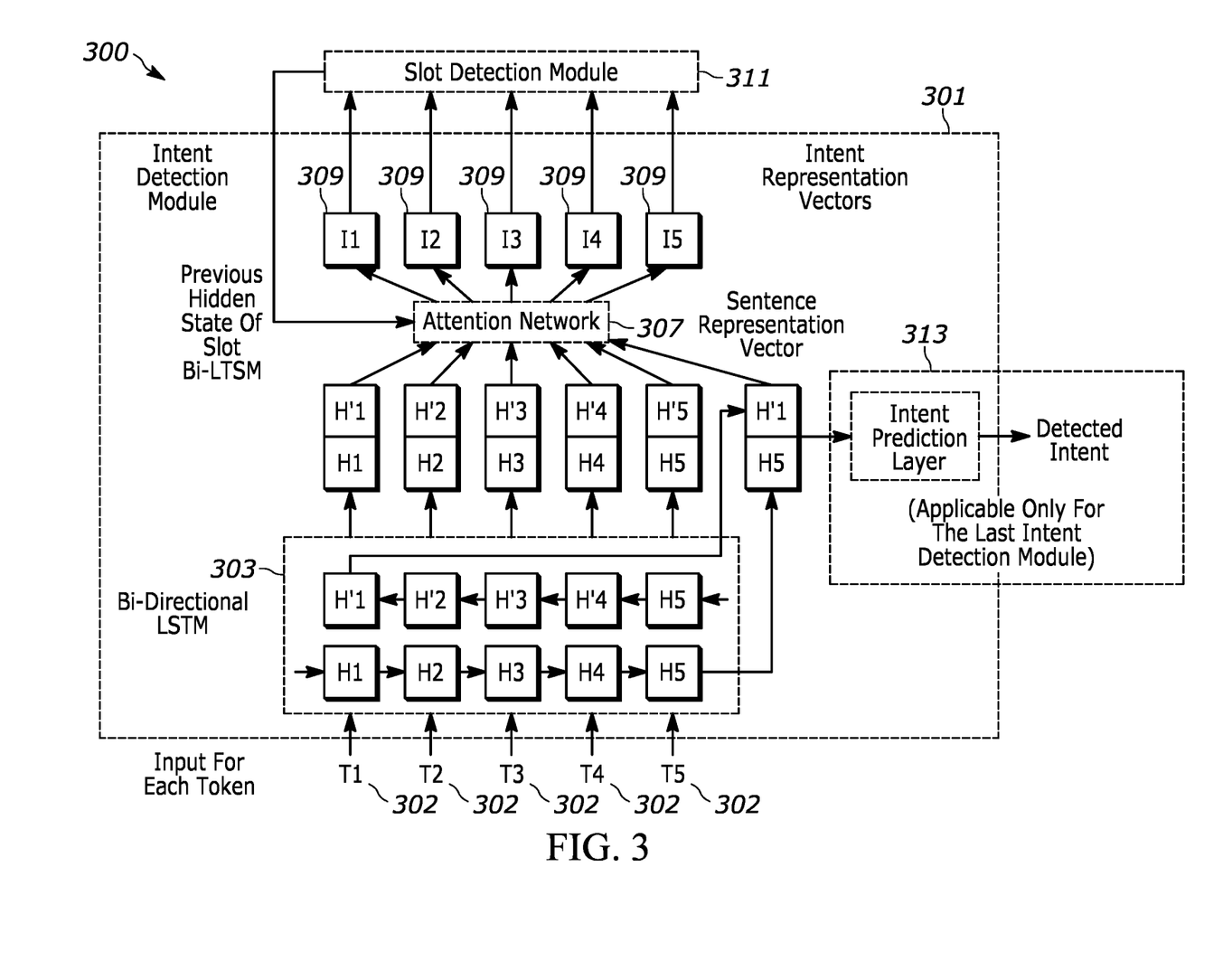
FIG. 3 illustrates a detailed overview of an intent detection module.

FIG. 3 is an embodiment of a system 300 including an intent detection module 301. A word embedding module may provide an intent detection module 301 with one word embedding vector for each word token associated with a statement or sentence. The intent detection module may attempt to provide the best possible intent information of the given sentence to the subsequent slot filling module, while the last intent module may generate the intent detection result. The tokens may be fed to a recurrent neural network 303, such as a bi-direction LSTM (BiLSTM).

For each token, the system may concatenate the word embedding with the slot information representation received from the previous slot filling module (for the first intent module, $s_k$ is invalidated as 0), and feed it into the intent module (e.g., BiLSTM). Upon receiving such input, the BiLSTM processes the given sentence in both forward and backward directions. We first extract token-wise intent hidden representation generated by the BiLSTM in each direction. The system may then concatenate the last states of both directions, each of which covers the information of the whole sentence, to generate a sentence-level intent representation. The representation may be effective for intent detection as it well captures the sentence context.

The recurrent neural network 303 may output a sentence representation vector to an attention mechanism 307. The attention mechanism 307 may work with a feedforward neural network to compute weighted sum, using weights calculated with the Softmax function. For the intention detection and slot filling modules, the system may set the hidden state dimension of the BiLSTM as 256 for each module, while in the intent module, the output dimension of the attention mechanism 307 may be 128. The attention mechanism 307 may leverage the sentence-level intent representation with the token-wise intent representations. The intent representation vectors 309 may be output to a slot detection module 311. The slot detection module may be any level slot detection module 311. When the intent detection module is a final intent detection module, the system may output a detected intent 313 in addition to output from an intent prediction layer indicating an intent representation vector.

Figure 4:
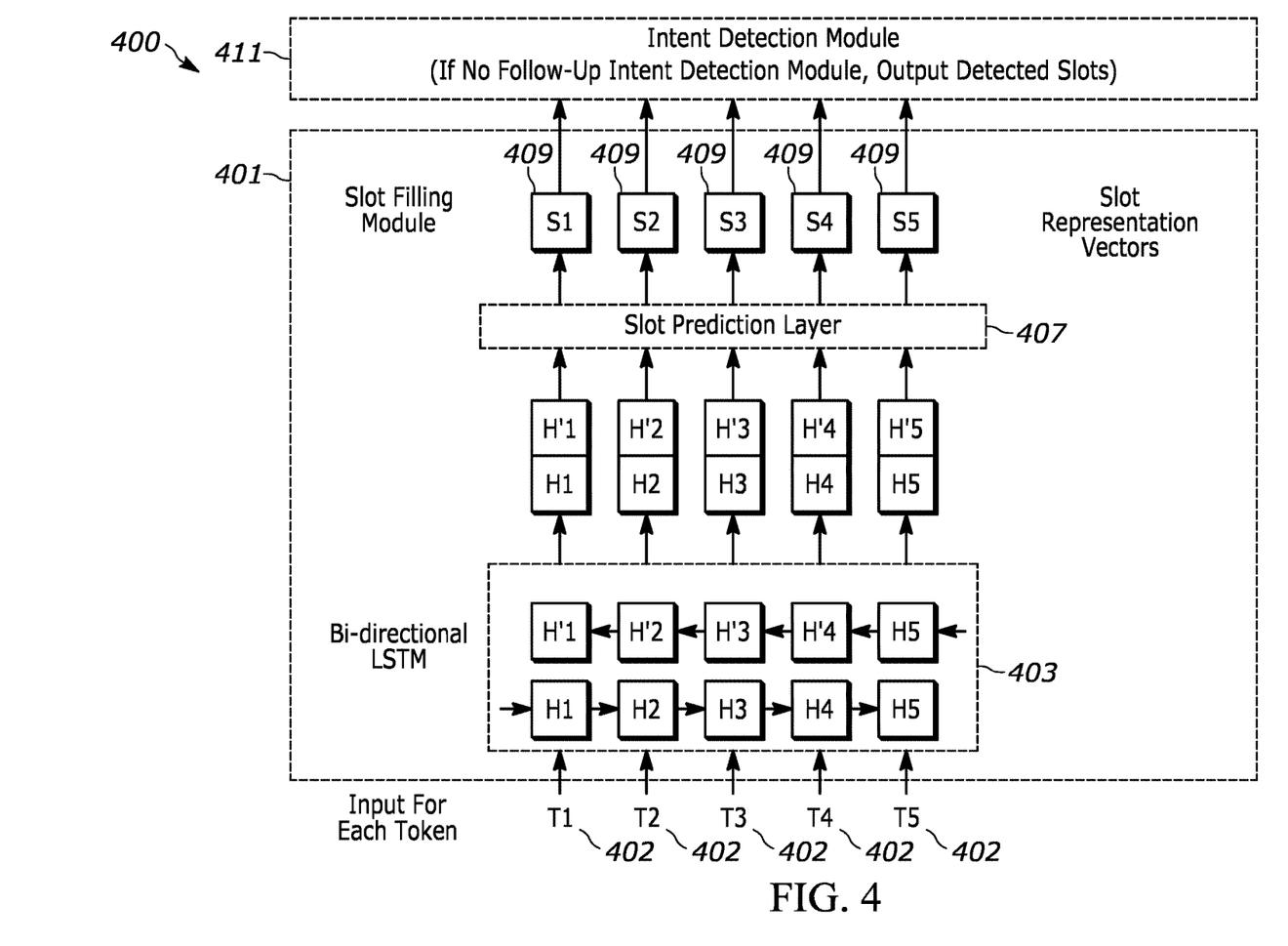
FIG. 4 illustrates a detailed overview of a slot detection module.

FIG. 4 is an embodiment of a system 400 including a slot filling module 401. For the slot filling module 401, the input for each BiLSTM 403 unit is the concatenation of the word bedding vector with the intent representation vector received from the previous intent detection module 411 for the corresponding word/token. The BiLSTM 403 unit may predict the slot label for each token 402 through a linear Softmax layer (e.g., slot prediction layer 407), also generating a probability vector per token that shows the probability of the focused token for each possible label. The slot prediction layer 407 may be utilized to place a higher value on certain commands, tasks, or words, based on the environment or domain in focus. Unless there is no following intent detection module, the probability vector is further transferred into a one-hot vector, in which the dimension corresponding to the highest probability is assigned as 1 and all other dimensions are assigned as 0. This one-hot vector is viewed as the slot representation vector 409, and fed into the next-level intent detection module 411 for the corresponding token/word. If no follow-up intent detection module 411 is shown, the system may output the detect slots via the intent detection module when the slot filling module 409 is the last slot filling module.

Figure 5:
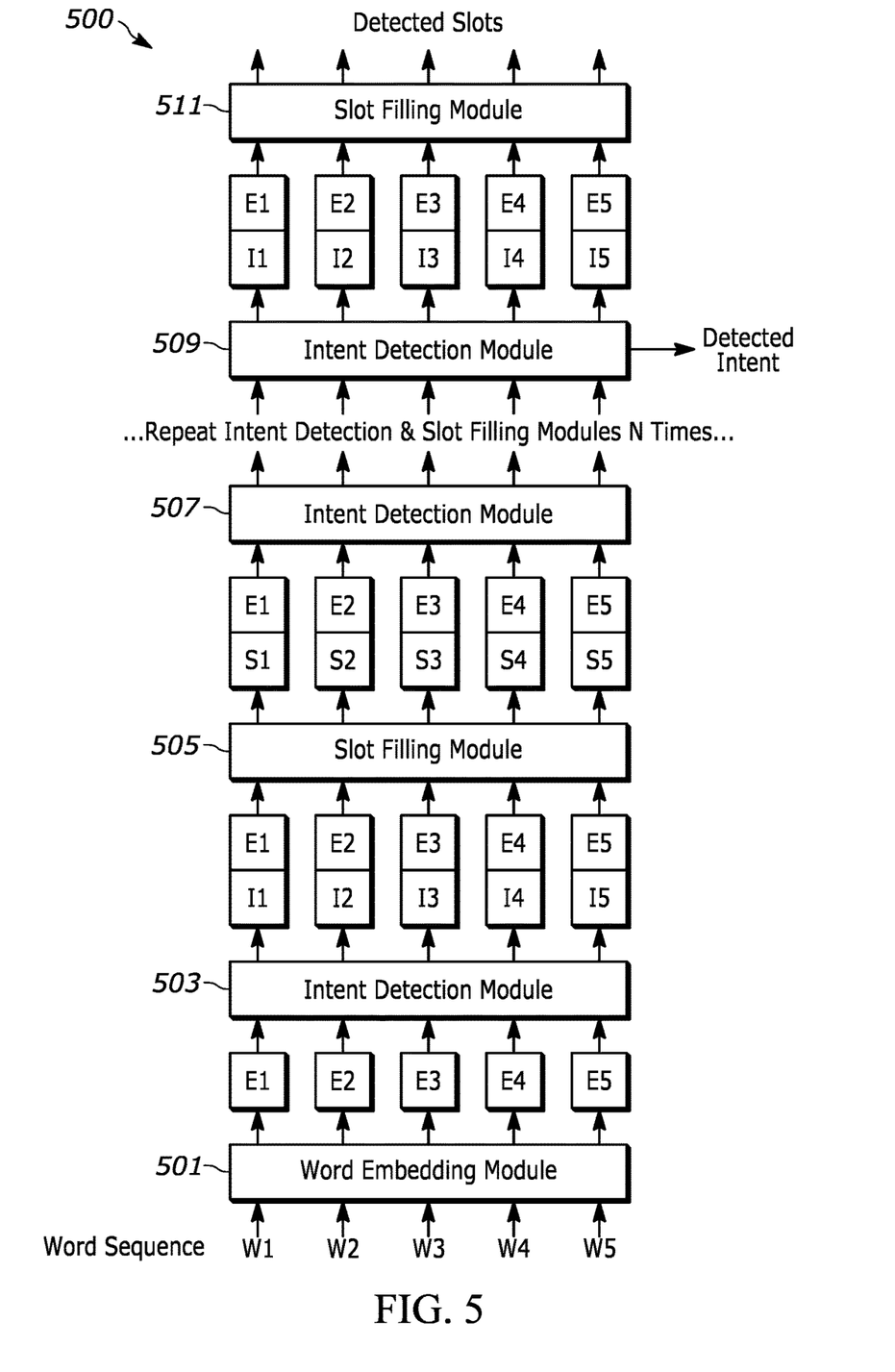
FIG. 5 illustrates a system including multiple levels of slot detection and intent detection layers.

FIG. 5 is an illustration of a system 500 embodying multiple intent detection modules and slot filling modules. The system 500 may repeat the intent detection and slot filling a number of times to various levels of slot filling modules and intent detection modules. Thus, a second level intent detection module 507 may be utilized. The system may repeat these steps until it reaches a final intent detection module 509. The final intent detection module 509 may finally detect the appropriate intent based on various parameters or thresholds, as discussed above. Then, the final slot filling module 511 may be utilized to output the detected slot(s). For example, while it appears that there are 3 intent detection modules, this is merely illustrative as any number of iterations may be utilized to determine a final detected intent.

In an illustrative experiment on the two NLU benchmarking datasets, ATIS and SNIPS. The experiment compared the proposed approach of an illustrative embodiment of the present disclosure with previous state-of-the-art NLU algorithms (i.e., Bert+CRF_joint, Bert_joint, Stack_Propagation, Encoder-decoder_NLU, Bi-model_with_decoder). The illustrative results are shown in Table 1. In this set of experiments, the experiment utilized set N=5 and used tied parameters for both the intent detection module and the slot filling module. For fair comparison, the experiment tested each algorithm five times. Each reported result in Table 1 is the average score of the five runs with the standard deviation shown in ( ). In the embodiment disclosed as labeled as "our proposed algorithm" outperforms the previous state-of-the-art NLU algorithms on the two popular public benchmarking data sets: ATIS and SNIPS over all the evaluation categories, as shown in Table 1 below. The result demonstrates the effectiveness of the method. In another embodiment, the illustrate experiment may also show that increasing the iteration number from 1 to 5 brings better performance.

TABLE 1

Comparisons of previous state-of-the-art NLU algorithms with the proposed algorithm of an illustrative embodiment. Each algorithm is evaluated 5 times, performance listed as average (standard deviation).

| Approach | On ATIS | | | On SNIPS | | |
|---|---|---|---|---|---|---|
| | Slot F1 | Intent Acc. | Semantic Acc. | Slot F1 | Intent Acc. | Semantic Acc. |
| Bert + CRF_joint | 95.72 (0.13) | 97.91 (0.25) | 87.56 (0.41) | 95.56 (0.61) | 98.34 (0.21) | 89.37 (1.14) |
| Bert_joint | 95.4 (0.25) | 88.0 (0.15) | 87.38 (0.54) | 95.6 (0.45) | 98.26 (0.29) | 89.29 (1.02) |
| Stack_Propagation | 94.56 (0.46) | 97.8 (0.17) | 85.07 (1.08) | 95.2 (0.36) | 98.26 (0.17) | 88.83 (0.93) |
| Encoder-decoder_NLU | 94.64 (0.43) | 97.42 (0.1) | 84.76 (0.79) | 91.29 (0.83) | 97.8 (0.19) | 81.29 (1.52) |

TABLE 1-continued

Comparisons of previous state-of-the-art NLU algorithms with the proposed algorithm of an illustrative embodiment. Each algorithm is evaluated 5 times, performance listed as average (standard deviation).

| Approach | On ATIS | | | On SNIPS | | |
|---|---|---|---|---|---|---|
| | Slot F1 | Intent Acc. | Semantic Acc. | Slot F1 | Intent Acc. | Semantic Acc. |
| Bi-model_with_decoder | 95.24 (0.2) | 96.68 (0.27) | 85.34 (0.26) | 93.5 (0.23) | 97.09 (0.19) | 84.37 (0.71) |
| Our Proposed Algorithm | 95.97 (0.16) | 97.96 (0.08) | 88.61 (0.45) | 96.23 (0.12) | 98.74 (0.14) | 90.6 (0.19) |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method, comprising:
   receive one or more word embedding vectors in response to data indicative of one or more words;
   outputting one or more intent representation vectors utilizing the one or more word embedding vectors via a first recurrent neural network associated with intent detection;
   outputting one or more slot representation vectors utilizing the one or more intent representation vectors and the one or more word embedding vectors via a second neural network associated with slot filling; and
   outputting a sentence intent and a slot label based on the one or more word embedding vectors, the one or more intent representation vectors, or the one or more slot representation vectors from either the first or second recurrent neural network, and that are utilized by a third recurrent neural network and a fourth recurrent neural network, wherein outputting the sentence intent involves a number of repetitions utilizing each of the recurrent neural networks to enable iterative intent detection and slot filling.

2. The computer-implemented method of claim 1, wherein the first and second recurrent neural network is a bi-directional long short-term memory (BiLSTM) network.

3. The computer-implemented method of claim 1, wherein the one or more intent representation vectors is output for each token or word associated with the one or more words.

4. The computer-implemented method of claim 1, wherein the one or more slot representation vectors are output for each token associated with the one or more words.

5. The computer-implemented method of claim 1, wherein the second recurrent neural network includes a slot prediction layer.

6. The computer-implemented method of claim 1, wherein the third recurrent and fourth recurrent neural network utilizing a linear Softmax layer.

7. The computer-implemented method of claim 1, wherein the method includes utilizing a BERT model configured for embedding one or more words.

8. The natural language system of claim 1, wherein a sentence representation vector is retrieved from recurrent neural network and provided to an attention work configured to output the intent representation vectors.

9. The natural language system of claim 1, wherein the recurrent neural network includes a bi-directional LSTM network.

10. The natural language system of claim 1, wherein a number of iterations is defined utilizing a predefined parameter.

11. The natural language system of claim 1, wherein a number of iterations is defined in response to either a training procedure or an inference procedure based on a threshold criteria.

12. The natural language system of claim 1, wherein a number of intent-slot repetitions is smaller for inference than in training.

13. A natural language system, comprising:
   a processor programmed to:
      receive data indicative of a natural language statement;
      provide one or more tokens associated with the natural language statement to a recurrent neural network;
      output one or more intent representation vectors in response to the one or more tokens and output one or more slot representation vectors in response to both the one or more tokens and the one or more intent representation vectors during a first iteration; and
      utilizing at least a second iteration in addition to the first iteration, output a sentence intent and a slot label based on the one or more tokens, the one or more intent representation vectors, or the one or more slot representation vectors from the first iteration, wherein outputting the sentence intent involves a number of repetitions utilizing one or more neural networks to enable iterative intent detection and slot filling.

14. A natural language system, comprising:
a processor programmed to:
  receive data indicative of a natural language statement;
  provide one or more word embedding vectors associated with the natural language statement to a recurrent neural network;
  output one or more intent representation vectors in response to the one or more word embedding vectors and output one or more slot representation vectors in response to both the one or more word embedding vectors and the one or more intent representation vectors during a first iteration; and
  utilizing at least one or more high-level iterations in addition to the first iteration, output a sentence intent and a slot label based on the one or more word embedding vectors, the one or more intent representation vectors, or the one or more slot representation vectors from a previous iteration, wherein outputting the sentence intent involves a number of repetitions utilizing a plurality of neural networks to enable iterative intent detection and slot filling.

15. The system of claim 14, wherein the processor is programmed to receive one or more slot information presentations to generate a sequence of representations to encode a detected intent.

16. The system of claim 15, wherein the slot information representations are generated in response to data from the previous iteration.

17. The system of claim 14, wherein the high-level iteration includes a slot prediction layer.

18. The system of claim 14, wherein multiple recurrent neural networks are utilized in the one or more high-level iterations.

19. The system of claim 14, wherein sentence is output in response to approaching convergence of a trained system.

20. The system of claim 14, wherein the processor is programmed to concatenate a last hidden state of each direction of a bi-directional long short-term memory (LSTM) network to generate a sentence representation vector.

* * * * *